March 21, 1944.     O. THIEL     2,344,657
VALVE SEAT CONSTRUCTION
Filed Feb. 26, 1943
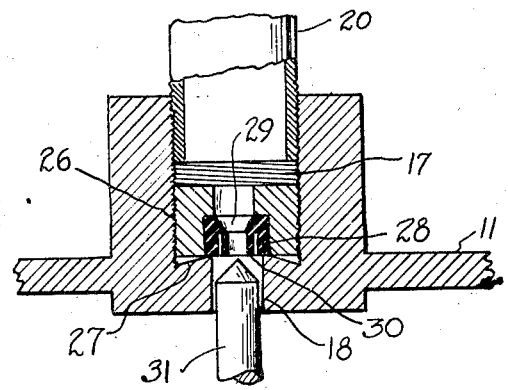
INVENTOR.
BY Otto Thiel
Daniel G. Cullen Patented Mar. 21, 1944

2,344,657

UNITED STATES PATENT OFFICE 2,344,657

VALVE SEAT CONSTRUCTION

Otto Thiel, Detroit, Mich.

Application February 26, 1943, Serial No. 477,193

1 Claim. (Cl. 251—167)

This application relates to valves, and discloses a valve seat construction of superior form, which will be understood upon reference to the appended drawing, which shows my valve seat construction.

The drawing shows a tank 11 having a socket 17 formed with a valve guide bore 18. An outlet tube 20 threads into the upper end of the socket.

Threaded into the lower end of the socket, below tube 20, is a hollow nut 26 which bears on a hollow rubber valve seat ring 30 in turn bearing on a shoulder 27 of the socket 17. The ring 30 has a center hole 29 for connecting the bore 18, through the center hole of the nut, to the tube 20. A separating groove 28, cut in the lower face of the ring 30 around the hole 29, but spaced inwardly from that portion of the ring which engages the shoulder 27, prevents the ring hole 29 from being deformed by the engagement of the ring and the shoulder 27 as the nut 26 is threaded tightly into the socket. Hole 29 is adapted to be closed by a needle valve 31, and forms a valved outlet for the tank. Valve 31 is smaller in diameter than bore 18 so that the annular space around valve 31 provides a fluid flow passage through bore 18, hole 29, and pipe 20 from the interior of tank 11.

By any suitable means, valve needle 31 is operated to drop or rise to open or close the opening 29.

In addition, the resistance offered by the ring to the valve comes from only the inner portion of the ring, between groove 28 and center hole 29, and none comes from the outer portion, outside of groove 28, for only the inner portion of the ring is required to flex in response to valve closing.

Now having described the construction herein disclosed, reference should be had to the claim which follows.

I claim:

Valve seat construction comprising a base having a threaded socket and a co-axial valve guide bore opening thereto, the bore being of less diameter than the socket, a hollow nut threaded into the socket and having a counter bored lower surface, a rubber valve seat ring in the counter bore of the nut bearing on the lower surface of the socket, a conical end valve member in the guide bore for closing the seat ring opening at its lower end, and a separating groove in the lower face of the ring around the ring opening, spaced inwardly from the socket engaging portion of the ring, to prevent the ring opening from being deformed by the engagement of the ring and the socket.

OTTO THIEL.